United States Patent [19]

Ryan et al.

[11] 3,982,985

[45] Sept. 28, 1976

[54] METHOD OF FORMING PANELS

[75] Inventors: James Ernest Ryan, Knebworth; Rodney Smale, Hatfield, both of England

[73] Assignee: Imperial Chemical Industries Limited, London, England

[22] Filed: May 5, 1975

[21] Appl. No.: 574,623

Related U.S. Application Data

[63] Continuation of Ser. No. 368,200, June 8, 1973, abandoned.

[30] Foreign Application Priority Data

June 14, 1972 United Kingdom............... 27448/72

[52] U.S. Cl................................ 156/303.1; 156/63; 156/219; 156/298; 156/306; 428/187; 428/195
[51] Int. Cl.²...................... B29D 3/00; B32B 31/00
[58] Field of Search........... 156/219, 220, 221, 222, 156/228, 293, 298, 303.1, 277, 77, 78, 79, 306; 260/2.5 L

[56] References Cited

UNITED STATES PATENTS

| | | | |
|---|---|---|---|
| 3,351,507 | 11/1967 | Schafer........................... | 156/298 X |
| 3,616,029 | 10/1971 | Lerman........................... | 156/219 X |
| 3,629,034 | 12/1971 | Kuroda............................ | 156/219 |
| 3,756,888 | 9/1973 | Kuroda............................ | 156/221 X |
| 3,763,056 | 10/1973 | Will................................. | 260/2.5 L |

*Primary Examiner*—Lorraine T. Kendell
*Attorney, Agent, or Firm*—Cushman, Darby & Cushman

[57] ABSTRACT

A method of forming a panel having a surface pattern, comprising placing a superstate lamina shaped to define the desired pattern onto a substrate, the substrate and superstrate both comprising cellular thermoplastic materials which are mutually discernible, pressing a die face against the surface of the superstrate lamina and against at least that portion of the substrate adjacent the superstrate, said die face having a temperature above the softening temperature of both the superstate and substrate thermoplastic materials, to thereby collapse the cellular structure of the superstrate and the substrate where contacted by the die and form an integral non-cellular surface layer containing the pattern as an integral part thereof, cooling the die face to harden said layer, and removing the die.

9 Claims, No Drawings

METHOD OF FORMING PANELS

This is a continuation of application Ser. No. 368,200 filed June 8, 1973, and now abandoned.

The invention relates to a method of forming panels from a plastics material, with an integral pattern (by which we include designs and motifs whether composed of single or repeated features) in at least one surface; and especially to the formation of panels having a cellular substrate and an integral non-cellular skin containing the integral pattern. The panel may for example as a laminal plaque or form part of the surface of a more complexly shaped article.

According to the invention, a method of forming a panel having an integral pattern in a surface layer, comprises placing onto a substrate, a superstrate lamina shaped to define the desired pattern, the substrate and the superstrate comprising cellular thermoplastic materials having contrasting colours or fillers, and applying to the superstrate and substrate a die whose face is heated to a temperature above the softening point of the thermoplastic material with sufficient pressure to cause the cellular structure of the superstrate and substrate where contacted by the die to collapse and conform to the face of the die.

The pattern may be formed by contrasting colours obtained by incorporating a dye or pigment into one of the strata, or by contrasting dyes or pigments in the different laminae. In this way the pattern may be visually recognisable. Subtle visual effects may be obtained by using a colourless filler, e.g. glass fibres, having a refractive index different from that of the thermoplastic in which it is embedded. Light-reflecting pigments may also be used so that, for example, only the area of the pattern reflects back light incident upon it. Such visual contrasts need only become apparent, however, when once the panel has been formed, the colours of some cellular materials, for example, being very pale until the cellular structure has been fused during the forming of the panel. A pattern may also be provided which is visible only when illuminated by radiation of a specific frequency, e.g. by fluorescence in ultra violet raidation. Furthermore, the pattern may be made specifically visually non-recognisable, by using a magnetic or radioactive filler whose position is capable of being monitored by a suitable detector, the active filler being disguised by a visually opaque filler in the same lamina of the panel or in a further continuous lamina overlying that which defines the shape of the pattern. However, in order that it will not be necessary to describe complicated detection equipment, the invention will be illustrated hereinafter by reference only to patterns formed in contrasting colours whereby their visual effect may be described.

During processing we find that the shape of the superstrate lamina can be substantially retained, and this includes not only its outline, but also any holes cut through it, which can allow the colour of the substrate to show through. If desired, the superstrate may be arranged to form only a minor portion of the surface, e.g. a pattern on a predominant background provided by the substrate, and where the pattern requires it, the superstrate may comprise a plurality of individual pieces arranged over the surface of the substrate as required. However, it is generally less easy to relatively position a plurality of individual pieces of superstrate lamina and to maintain their position as the die approaches, than it is to form such features as a plurality of holes in a superstrate, wherein the plurality of features are formed by the colour of the substrate appearing through the hole. Moreover, where the pattern consists of white markings on a coloured background, it is generally more economical to to use a white substrate (requiring no additional colouring matter), and to use a relatively thin layer of coloured superstrate with the desired features cut out so that the white substrate shows through the holes. In providing a multicoloured pattern, the substrate may consist of a plurality of differently coloured pieces, and these may overlap where this facilitates the maintenance of their relative positions during pressing, if the overlying pieces are sufficiently opaque when pressed.

We prefer to use substantially the same material for each lamina, the differences being limited to variations in dyes, pigments, decorative fillers and the like, and in doing so have not found any difficulty in readily obtaining good adhesion between the laminae. The materials we particularly prefer are the thermoplastic water-extended polymers. These materials may be obtained with a very finely celled structure, e.g. with the majority of cells having a diameter of 10 $\mu$m or less, and with such materials we find we can obtain good definition of the pattern even while using a sufficiently thick superstrate to provide a significant depth to the colours forming the pattern, and generally with lower die pressures than are required to collapse the larger cells occurring in most gas-blown foams. Furthermore, it is easy and relatively cheap to produce a sheet of water-extended polymer even in small quantities, since it can be produced without the necessity of either extrusion apparatus or efficient heat exchange means for preventing the monomer boiling due to the exotherm of the polymerisation reaction.

Water-extended polymers are formed from inverted emulsions having a continuous phase comprising an oil having a polymerisable constituent, and an aqueous disperse phase, the emulsions generally requiring a suitable emulsifier to stabilise them in the inverted condition. Suitable liquid monomers include, for example, monoethylenically unsaturated compounds such as styrene, methyl-, ethyl-, butyl-methacrylate or acrylate, and vinyl acetate. Monomers which normally exist in the gaseous state but which may be liquefied under pressures, may be used by carrying out the reaction in suitable pressure vessels if desired. Mixtures of monomers may also be used. The preferred monomer is methyl methacrylate because of the ease with which it can be dried, and it preferably comprises at least 80% by weight of the polymerisable constituent.

In carrying out the method of the present invention, it is clearly important that the polymeric material be truly thermoplastic so as to be capable of flowing. Hence we find it is important to minimise cross-linking, and correspondingly it is important to select emulsifiers which do not contribute to cross-linking during polymerisation of the monomer, or which may be used in such small amounts that the cross-linking occurs only to a very small degree. Thus for example, unsaturated polyesters of propoxylated bisphenol A and one or more ethylenically unsaturated dicarboxylic acids such as fumaric or maleic acids, produce particularly stable emulsions, but also contribute to some cross-linking. We therefore prefer when using such polyesters to use the smallest quantity capable of producing an emulsion with the required water content. Our preferred quantity of these polyesters for stabilising emulsions with water contents of 50–90% by weight, lies within the range 0.3 to 5% by weight of the monomer, but even with quantities as low as 5%, we find great difficulty in producing sufficient flow to obtain good results. We generally find that 1 to 2% is suitable.

Our preferred emulsifiers are those which are free from any group capable of producing cross-linking between molecules of the polymerising continuous phase, and of these we find ethyl celluloses which are soluble in the continuous phase to be generally suitable. The quantities of ethyl cellulose which may be used, do not appear to be very critical, and generally we find 0.5 to 5% by weight of the monomer to be convenient, larger quantities of ethyl cellulose producing increasingly viscous emulsions making high water-content emulsions more difficult to obtain. We generally prefer to use about 2% by weight for stabilising emulsions containing about 70 to 80% by weight of water in correspondingly 30 to 20% by weight of methyl methacrylate.

The polymers may be made to flow more easily by using high quantities of catalyst so as to produce a low molecular weight, or by the copolymerisation of suitable modifiers. Suitable modifiers include acrylates, particularly those providing the polymer chain with bulky side groups, such as 2-ethyl hexyl acrylate which may suitably be used in quantities of from 5 to 20% by weight of the total monomers, preferably within the range of 10 to 15% by weight. The use of such modifiers becomes most important when there is a tendency for small amounts of cross-linking to occur. However, they may also be used to improve the flow properties, even in the absence of cross-linking, if desired.

The oil phase may contain, if desired, polymer dissolved in the monomer, e.g. polymethyl methacrylate dissolved in the methyl methacrylate. Such solutions may be useful in speeding the rate of the polymerisation reactions, but generally we find they are not necessary and that it is therefore preferable to omit them.

The cell-forming water is initially encapsulated in the polymerised material and to obtain good results this water should be removed from at least those cells which are collapsed during the process of the invention. This drying, however, need not be rigorous. With most materials, even with closed cell structures, the water tends to slowly diffuse to the outer surfaces of the article where it evaporates leaving an air-filled porous structure. This diffusion may be relatively rapid with polymers such as polymethyl methacrylate, and will continue until equilibrium is reached with the water vapour of the atmosphere (about 2% by weight of water in the case of polymethyl methacrylate). Such small amounts of water do not normally present any problems. The drying process may be speeded up by suitable means of desiccation such as the application of heat to the polymerised material, by placing it in a dry atmosphere, or even under vacuum. The drying can be considerably hindered by free methyl methacrylate monomer migrating to the surface and polymerising to form a skin, and hence it is desirable to complete the polymerisation process as far as possible before drying is commenced.

For most applications, it is preferred to use a die having a smooth face, so as to produce a glazed surface on the decorated panel. However, it is not essential that the die face be flat, and for many applications a gentle convex curvature on the panel may be desirable. It should be noted however, that a correspondingly concave die surface will cause the collapse of more cells at the edges of the panel than towards its centre, giving rise to possible gradation of glaze thickness, if the panel blank is initially flat surface. Hence unless special effects are required, we generally prefer to cast the substrate with a curvature similar to that of the die where appropriate. A textured or deeply embossed surface may be formed at the same time as the laminations are made, by correspondingly relieving the surface of the die. For example, the surface of the panel may be textured to give a finish similar in appearance to a woven material, or the surface may be embossed in a configuration conforming to the pattern so as to emphasise one or more features of that pattern.

The thickness of the superstrate may be selected according to the desired thickness of the pattern colouring. However, for good resolution and good adhesion to the substrate, we generally prefer that the thickness of the superstrate be not more than 6 mm. For ease of handling, we prefer that the superstrate thickness should be at least 3 mm, although thinner sheets may be used where particularly high resolution and definition of the pattern is required. We find that a superstrate thickness of 5 mm is generally most convenient.

The method of the present invention may be used wherever a patterned surface is required on suitable thermoplastic material. Articles which may readily incorporate panels formed in this manner, include for example advertisement displays in which the panels may be self supporting or may form an integral part of a more complexly shaped article, and for road signs or the like. By reason of the depth to which the colour extends, the panels are particularly suited for use under conditions which are liable to experience wear. Thus for example in external applications, the pattern may be less readily removed by abrasion from wind-carried dust particles and the like, than might a thin painted coating of similar abrasion resistance, applied to the surface of an article. Similarly, with finger plates on doors and other furniture which are required in a decoratively patterned form, the surface may be worn away to the depth of the colour, before deterioration of the pattern is experienced (in contrast to the effect of wear on a thin layer of colourant applied to the surface).

The invention is illustrated by the following Examples wherein Examples 1–5 describe a process carried out according to the present invention and Example 6 is comparative.

EXAMPLE 1

An emulsion was made by passing 75 parts by weight of water and 25 parts by weight of an oil through an emulsifying machine wherein shear stresses were applied to the mixture to form the emulsion. The oil comprised 2% by weight of ethyl cellulose, 10% by weight of 2-ethyl hexyl acrylate, 1.5% by weight of tertiary butyl perpivolate, the balance to 100 weight % being methyl methacrylate in which the other components were dissolved. The ethyl cellulose used was a commercially available grade, N10, marketed by Hercules Powder Company Limited, having an ethoxyl content specified as falling within the range 47.5 to 49.0% by weight, and having a viscosity within the range 8 to 11 cP for a 5 weight % solution in 80:20 toluene:ethanol of a sample dried 30 min at 100°C, the viscosity being measured at 25°C. The emulsion was divided into two parts, one part remaining without any colourant, and to the other part was added 0.05% by weight of blue dye.

The two parts were poured into separate rectangular moulds to a depth of about 64 mm, where they were heated to about 45°C and then left for about 24 hours to allow the emulsions to cure and form two water-filled cellular sheets. The blue sheet was then cut into 5 mm slices, the two outer layers being discarded. The uncoloured sheet and blue slices were dried in a hot air oven for an initial period of 2 days during which time the temperature was kept below 100°C as the bulk of the water was driven off. The temperature was then increased to 110°C. The thinner blue slices were removed after 1 day, but the thicker sheet was left for a further 10 days before being removed. From a blue slice was cut a circular disc about 23 cm diameter from the middle of which was cut an arrow whose shaft was about 3 cm wide, the head of the arrow being an equilateral triangle of side about 5 cm.

The disc was placed on the surface of the thicker uncoloured sheet, between two flat-surfaced dies of a press. The upper die which was pressed on the blue disc was heated to a temperature of 150°C, whilst the lower die was unheated. The sheets were pressed between the two dies with a pressure of about 22 bar for about 1 min, and the die then cooled to 80°C to harden the polymer while the pressure was maintained. The pressure was then released and the die withdrawn. In the resultant panel, the surface of the blue superstrate was flat with the surface of the uncoloured substrate, the surface being very smooth and shiny. The uncoloured substrate, and hence the arrow, appeared white because of its cellular structure, and the edge of the arrow was well defined. A section through the panel showed the blue colouration to extend to a depth of about 1 to 1.5 mm.

EXAMPLE 2

The process described in Example 1 was repeated except that the surface of the upper, heated die had a matt surface. After the die has been cooled and removed, the panel surface remained correspondingly matt.

EXAMPLE 3

The process described in Example 1 was repeated with the exception that the superstrate had several star-shaped holes cut out instead of the arrow of Example 1. The resultant panel had an integral non-cellular skin within which the pattern was formed as a blue background on which were several well-defined white stars.

EXAMPLE 4

The process described in Example 3 was repeated using a die relieved with a weave pattern. The patterned panel was formed with a correspondingly embossed surface.

EXAMPLE 5

The process described in Example 1 was again repeated, except that the blue superstrate has a T-shape cut out, and a red rectangular sheet placed in the cross-member of the T, the red rectangular sheet having approximately the same thickness as the blue disc, and being formed from the same materials except for the change of colouring matter. After pressing, the pattern in the integral skin was a T-shape having a red cross-member above a white stem, with all on a blue background.

EXAMPLE 6

In this example are described comparative experiments which are outside the scope of the present invention but which are included herein to show the effect of using sheets of solid, rather than cellular, materials for the superstrate lamina.

The substrate used was a sheet of uncoloured water-extended polymer prepared as described in Example 1. The superstrate was a disc of clear 'Perspex' polymethyl methacrylate sheet, 1.6 mm thick and shaped as the disc used in Example 1. The two laminae were pressed together using a heated die as described in the previous example. On removing the die, the superstrate disc was found to have been pushed into the cellular substrate to form a continuous flat surface, but on cooling the edges of the disc tended to lift from the substrate. The remainder could then be readily lifted off, showing that little or nor bonding had been effected.

The operation was repeated using fresh laminae, after painting the interface with chloroform. There was no apparent increase in adhesion. Even painting the interface with a cold-setting methyl methacrylate composition before pressing, failed to provide the integration of the two laminae which we obtained using a cellular superstrate as described in Example 1.

Clear Perspex was used in this test because we had available sheets whose thickness at 1.6 mm approximated that of the non-cellular layer formed from the cellular disc in Example 1. All coloured material available at the time was considerably thicker at 2.5 mm. Although the tendency for the edges of the thicker material to curl up on cooling seemed to be less, there did not appear to be any greater adhesion to the cellular substrate.

We claim:
1. A method of forming a panel having a surface pattern, comprising:
  a. placing a superstrate lamina shaped in outline to define the desired pattern onto a substrate, the substrate and superstrate both consisting of cellular thermoplastic materials which are mutually discernible;
  b. applying a die face against the surface of the superstrate lamina and against at least that portion of substrate adjacent the superstrate, said die face having a temperature above the softening temperature of both the superstrate and substrate thermoplastic materials;
  c. pressing the die against the superstrate and the substrate with sufficient pressure to form a smooth glazed surface on the substrate where contacted by the die and to collapse the cellular structure of the superstrate and form a smooth glazed surface thereon thereby resulting in a panel having a single unitary non-cellular surface layer containing the pattern as an integral part thereof;
  d. cooling the die face to harden said non-cellular surface layer; and
  e. removing the die.

2. A method according to claim 1 which comprises forming at least one of the substrate and superstrate lamina from a water-extended polymer formed from an inverted emulsion having a continuous phase comprising an oil having a polymerizable constituent and an aqueous disperse phase, the emulsion being cured to form a water-filled cellular material; removing the water of the disperse phase from at least that part of the water-extended polymer to be fused, placing the superstrate and substrate in their desired relative positions, and applying the heated die face thereto.

3. A method according to claim 1 in which the substrate and superstrate are formed in contrasting colours so that a visible pattern is formed in the surface.

4. A method according to claim 3 in which the features of the pattern are formed by a plurality of holes produced in the superstrate prior to lamination, whereby the substrate fills the holes during pressing with the contrasting colour to form the features of the pattern.

5. A method according to claim 1 in which the surface of the heated die is relieved so as to provide a correspondingly embossed surface on the panel.

6. A method according to claim 2 in which the polymerisable constituent of the inverted emulsion from which the water-extended polymer is formed, comprises at least 80% by weight of methyl methacrylate.

7. A method according to claim 2 in which the emulsifier used to form the emulsion, is free from any group capable of producing cross-linking between molecules of the polymerising continuous phase.

8. A method according to claim 6 in which 2-ethyl hexyl acrylate comprises from 5 to 20% by weight of the total monomers.

9. A method according to claim 1 in which the superstrate has a thickness of from 3 to 6 mm.

* * * * *

UNITED STATES PATENT OFFICE
CERTIFICATE OF CORRECTION

Patent No. 3,982,985          Dated September 28, 1976

Inventor(s) James Ernest Ryan and Rodney Smale

It is certified that error appears in the above-identified patent and that said Letters Patent are hereby corrected as shown below:

At paragraph [30] on the front page format, after "United Kingdom", delete "27448/72" and insert --27748/72--

Signed and Sealed this

Tenth Day of May 1977

[SEAL]

*Attest:*

RUTH C. MASON
*Attesting Officer*

C. MARSHALL DANN
*Commissioner of Patents and Trademarks*